United States Patent
Pai et al.

(10) Patent No.: US 8,022,672 B2
(45) Date of Patent: Sep. 20, 2011

(54) CHARGER CONTROL CIRCUIT AND CHARGER CONTROL METHOD

(75) Inventors: Chung-Lung Pai, Taipei (TW); Shih-Hui Chen, Kaohsiung (TW)

(73) Assignee: Richtek Technology Corporation, Hsin-Chu (TW)

( * ) Notice: Subject to any disclaimer, the term of this patent is extended or adjusted under 35 U.S.C. 154(b) by 379 days.

(21) Appl. No.: 12/378,114

(22) Filed: Feb. 11, 2009

(65) Prior Publication Data

US 2009/0243551 A1 Oct. 1, 2009

(30) Foreign Application Priority Data

Mar. 26, 2008 (TW) .................. 97110860 A

(51) Int. Cl.
*H02J 7/00* (2006.01)
*H02J 7/04* (2006.01)
*H02M 3/335* (2006.01)

(52) U.S. Cl. ........ 320/128; 320/133; 320/139; 320/141; 320/155; 320/162; 363/20; 363/21.01; 363/78; 363/95; 363/97

(58) Field of Classification Search .................. 320/128
See application file for complete search history.

(56) References Cited

U.S. PATENT DOCUMENTS

| 6,344,983 | B1 * | 2/2002 | Glennon | 363/21.12 |
|---|---|---|---|---|
| 6,665,197 | B2 * | 12/2003 | Gong et al. | 363/21.01 |
| 6,947,296 | B2 * | 9/2005 | Hirosawa | 363/20 |
| 7,411,374 | B2 * | 8/2008 | Tan et al. | 320/166 |
| 7,471,522 | B2 * | 12/2008 | Ng et al. | 363/21.12 |
| 7,561,452 | B2 * | 7/2009 | Mednik et al. | 363/97 |
| 7,646,616 | B2 * | 1/2010 | Wekhande et al. | 363/21.12 |
| 2007/0103943 | A1 * | 5/2007 | Mangtani et al. | 363/20 |
| 2007/0263415 | A1 * | 11/2007 | Jansen et al. | 363/21.03 |
| 2009/0128209 | A1 * | 5/2009 | Chu et al. | 327/177 |

FOREIGN PATENT DOCUMENTS

| CN | 1471224 A | 1/2004 |
|---|---|---|
| JP | 2004-023894 A | 1/2004 |

\* cited by examiner

*Primary Examiner* — Patrick Assouad
*Assistant Examiner* — Nathaniel Pelton
(74) *Attorney, Agent, or Firm* — Tung & Associates

(57) ABSTRACT

The present invention discloses a charger control circuit and a charger control method for controlling a charger having a transformer, the transformer including a primary winding and a secondary winding. The charger control circuit comprises: a power switch coupled to the primary winding; a switch control circuit controlling the operation of the power switch; and a detection circuit which generates a signal according to a voltage at a node between the power switch and the primary winding, and supplies the signal to the switch control circuit.

11 Claims, 7 Drawing Sheets

CHARGER CONTROL CIRCUIT AND CHARGER CONTROL METHOD

BACKGROUND OF THE INVENTION

1. Field of Invention

The present invention relates to a charger control circuit and a charger control method.

2. Description of Related Art

One example of the chargers is the photoflash capacitor charger. Such charger has a basic structure as shown in the upper half of FIG. 1, in which an input terminal Vin charges a capacitor Cout at the output terminal Vout through a transformer 10. The charging time is controlled by a power switch 21 in a charger control circuit 20. The charger control circuit 20 is usually an integrated circuit (IC). In the prior art shown in FIG. 1, the operation of the power switch 21 is controlled by a switch control circuit 25, which determines the ON time of the power switch 21 according to a detection result obtained from the secondary side of the transformer 10. More specifically, the resistor R in the circuit converts the secondary current to a voltage signal, and this voltage signal is compared with a reference voltage Vref in a comparator 23. When the voltage signal is lower than the reference voltage Vref, it means that the secondary current is close to zero and there is no current charging the capacitor Cout. Hence, the switch control circuit 25 turns ON the power switch 21 so that an induced current is generated by the transformer 10 to charge the capacitor Cout. The OFF time of the power switch 21 is determined by the primary current (relevant circuit not shown); when the primary current reaches a predetermined threshold, the switch control circuit 25 turns OFF the power switch 21.

The above mentioned prior art has the drawback that a large amount of current will flow into the charger control circuit 20, causing noises and errors. In addition, large primary current spikes would occur.

FIG. 2 shows another prior art circuit which senses the charging current by obtaining a signal from the primary side. More specifically, it compares the voltages at the two sides of the primary winding, and the switch control circuit 25 controls the ON time of the power switch 21 according to the comparison result. When the difference between the voltages at the two sides of the primary winding is close to zero, it means that there is no induced current flowing on the transformer 10, and hence the switch control circuit 25 turns ON the power switch 21. This prior art solves some of the drawbacks of the prior art in FIG. 1; however, in both the prior art of FIGS. 1 and 2, the charger control circuit IC 20 requires two pins (P1 and P2, or P1 and P3) to detect the charging current for feedback control.

In view of the foregoing drawbacks, it is desired to provide a charger control circuit with less number of pins, and it does not require obtaining a feedback signal from the secondary side.

SUMMARY OF THE INVENTION

A first objective of the present invention is to provide a charger control circuit to overcome the drawbacks in the prior art.

A second objective of the present invention is to provide a charger control method.

In accordance with the foregoing and other objectives, in one aspect, the present invention discloses a charger control circuit for controlling a charger having a transformer, the transformer including a primary winding and a secondary winding, the charger control circuit comprising: a power switch coupled to the primary winding; a switch control circuit controlling the operation of the power switch; and a detection circuit which generates a signal according to a voltage at a node between the power switch and the primary winding, and supplies the signal to the switch control circuit.

Optionally, the charger control circuit can further include a delay circuit to delay the ON time of the power switch.

Preferably, the detection circuit of the charger control circuit includes: an RC shunt circuit; and a comparator having one input receiving a voltage signal relating to the RC shunt circuit and the other input receiving a voltage signal relating to the voltage at the node. The "voltage signal relating to the voltage at the node" for example may be the voltage at the node itself or a dividend voltage thereof.

In another aspect, the present invention discloses a charger control method for controlling a charger having a transformer, the transformer including a primary winding and a secondary winding, the charger control method comprising: providing a power switch coupled to the primary winding; detecting a voltage at a node between the power switch and the primary winding; and controlling the operation of the power switch according to the detected voltage.

Preferably, the step of detecting a voltage at a node includes: obtaining a first signal relating to the voltage at the node; lowering the magnitude of the first signal and delaying the first signal to obtain a second signal; and detecting the cross point between the first signal and the second signal.

It is to be understood that both the foregoing general description and the following detailed description are provided as examples, for illustration but not for limiting the scope of the invention.

BRIEF DESCRIPTION OF THE DRAWINGS

These and other features, aspects, and advantages of the present invention will become better understood with regard to the following description, appended claims, and accompanying drawings.

DESCRIPTION OF THE PREFERRED EMBODIMENTS

Figure 1:
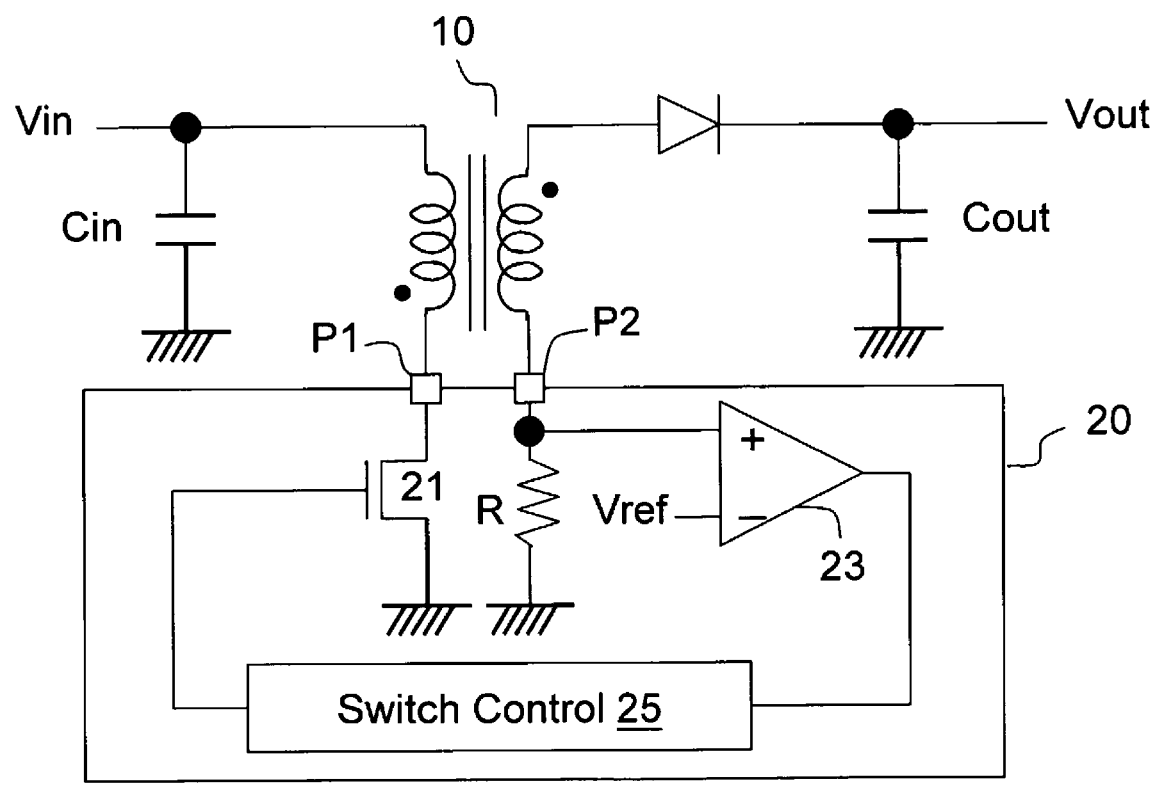
FIG. 1 is a schematic circuit diagram showing a prior art circuit.
Figure 2:
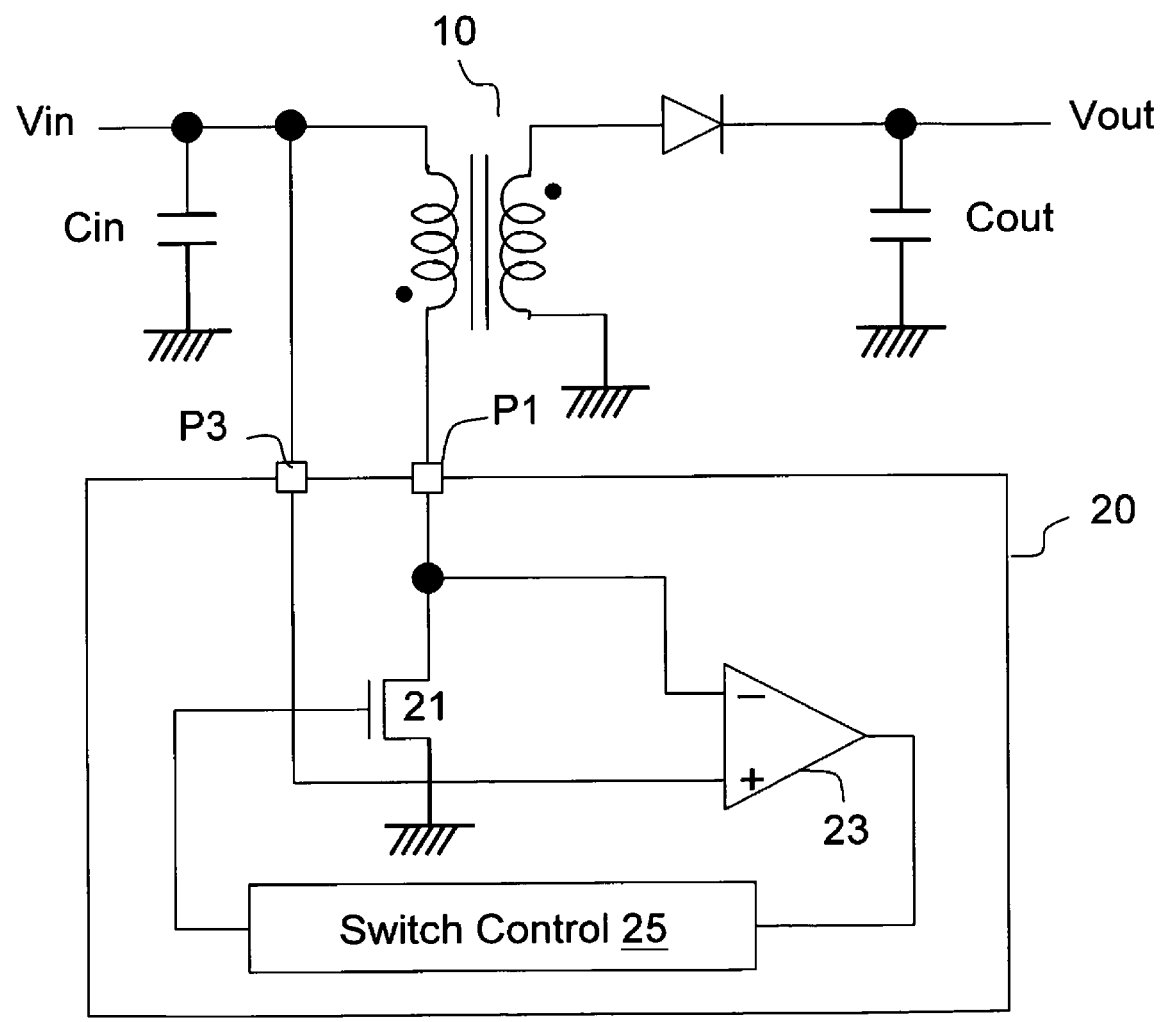
FIG. 2 is a schematic circuit diagram showing another prior art circuit.
Figure 3:
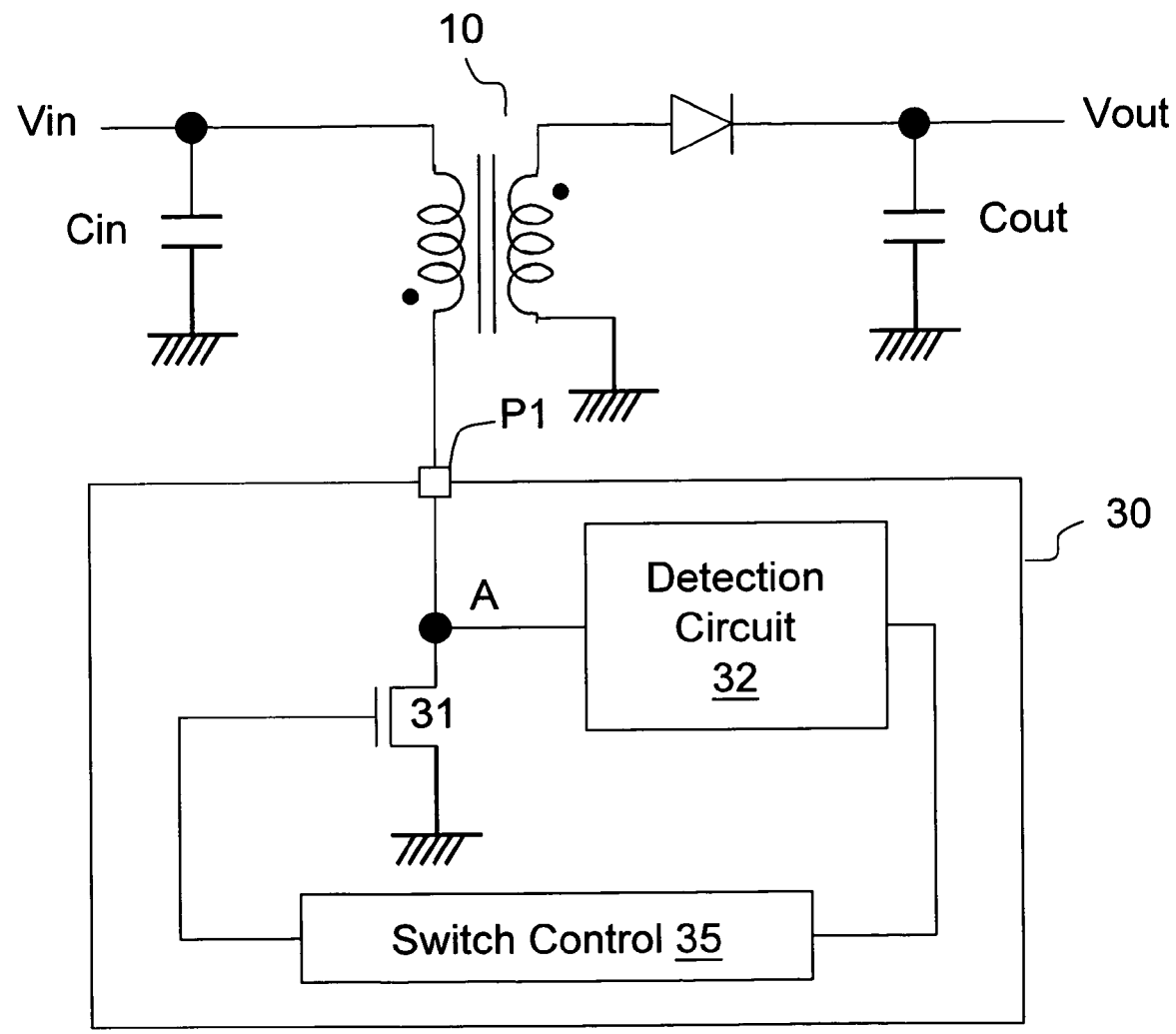
FIG. 3 is a schematic circuit diagram explaining the concept of the present invention.

Referring to the schematic circuit diagram of FIG. 3, the charger control circuit 30 of the present invention requires only one pin P1 for detecting the charging current and controlling the power switch 31. As shown in the figure, the charger control circuit 30 detects the voltage variation at the node A at the primary side by a detection circuit 32. When the secondary current is close to zero, the voltage at the node A varies accordingly; the detection circuit 32 outputs a corresponding signal to the switch control circuit 35 to control the operation of the power switch 31.

Figure 4:
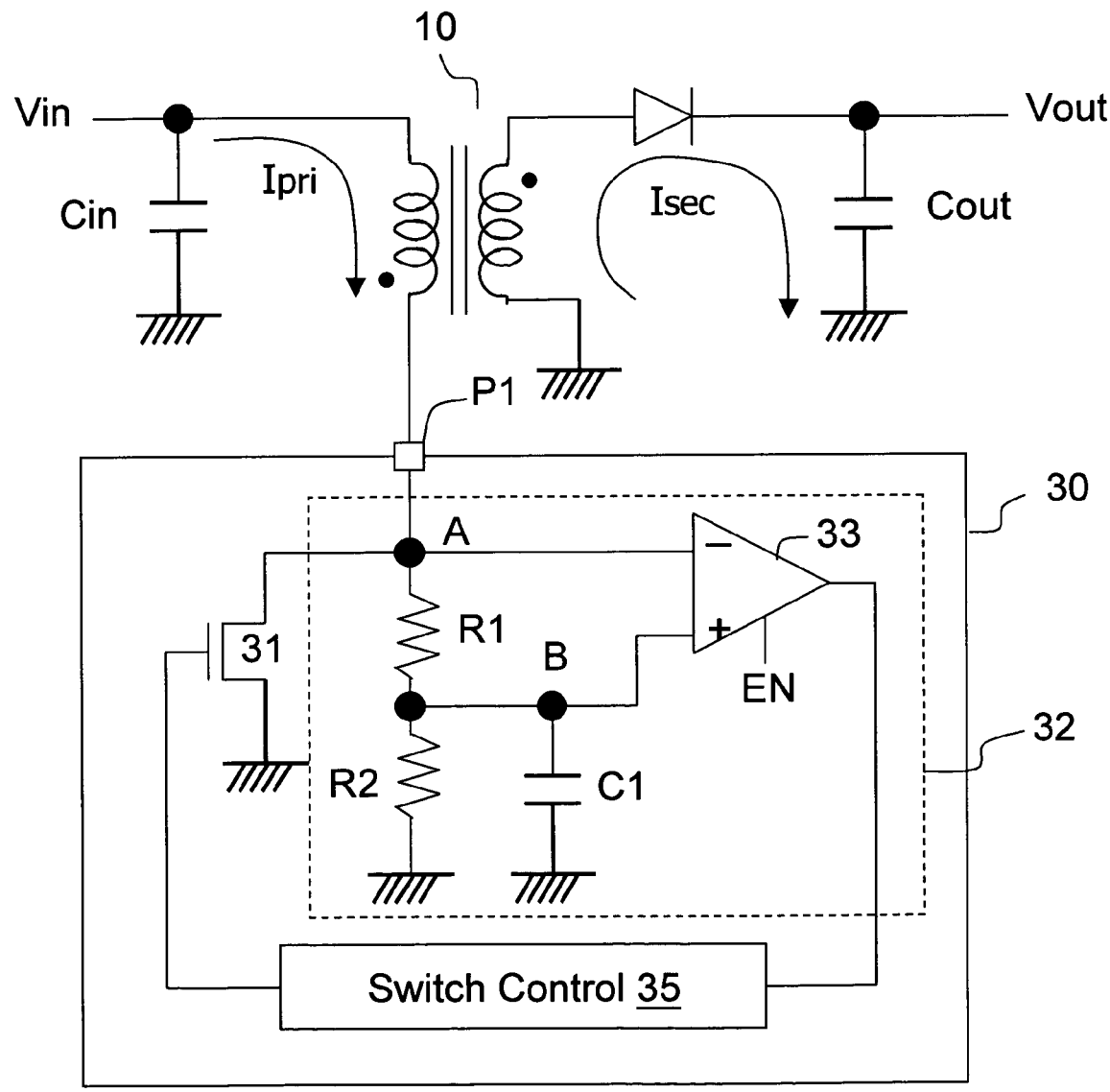
FIG. 4 is a circuit diagram showing an embodiment of the present invention.

A more detailed embodiment of the above concept is shown in FIG. 4. The detection circuit 32 includes resistors R1, R2, a capacitor C1, and a comparator 33. The comparator 33 compares the voltages at the nodes A and B, to determine the ON time of the power switch 31; the OFF time of the power switch 31 for example can be determined according to the time when the primary current Ipri reaches a predetermined threshold (relevant circuit not shown). An enable signal EN controls the comparator 33 so that the comparator 33 is operative only when the power switch 31 is OFF, but is inactive when the power switch 31 is ON.

Figure 5:
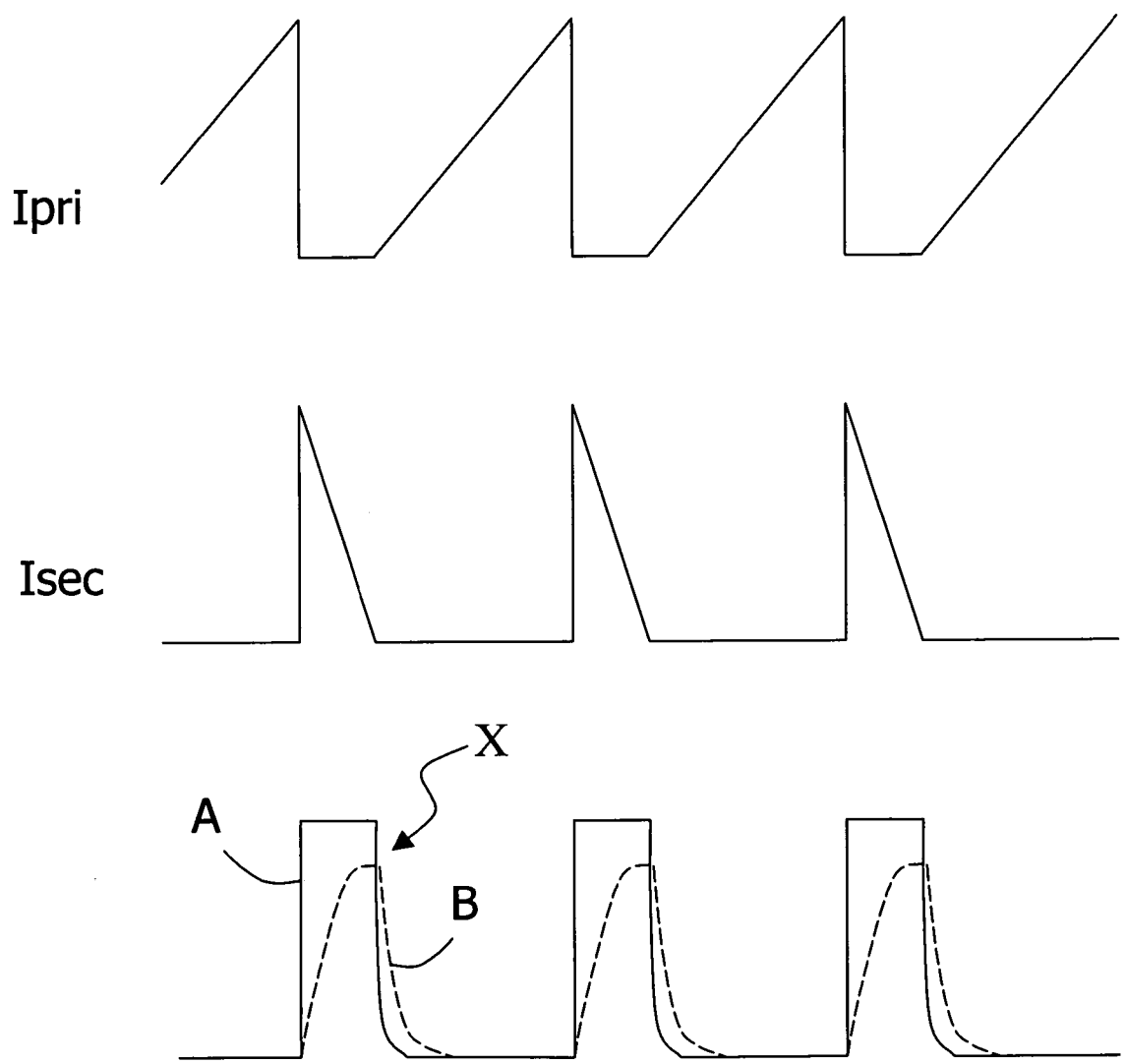
FIG. 5 is a waveform diagram showing the waveforms of the primary current, the secondary current, and the voltages at the nodes and B in the circuit of FIG. 5.

Referring to FIG. 4 in conjunction with FIG. 5, when the power switch 31 is OFF, the secondary winding charges the output capacitor Cout; when the secondary current Isec is close to zero, the voltage at the node A at the primary side drops drastically. However, due to the voltage drop caused by the resistor R1 and the time delay caused by the RC shunt circuit of the resistor R2 and the capacitor C1, the voltage at the node B has a lower magnitude and responds slower, so that there will be a cross point X between the voltages at the node A and the node B. Thus, the comparator 33 can output a corresponding signal to the switch control circuit 35 according to this cross point X, to control the ON time of the power switch 31.

Figure 6:
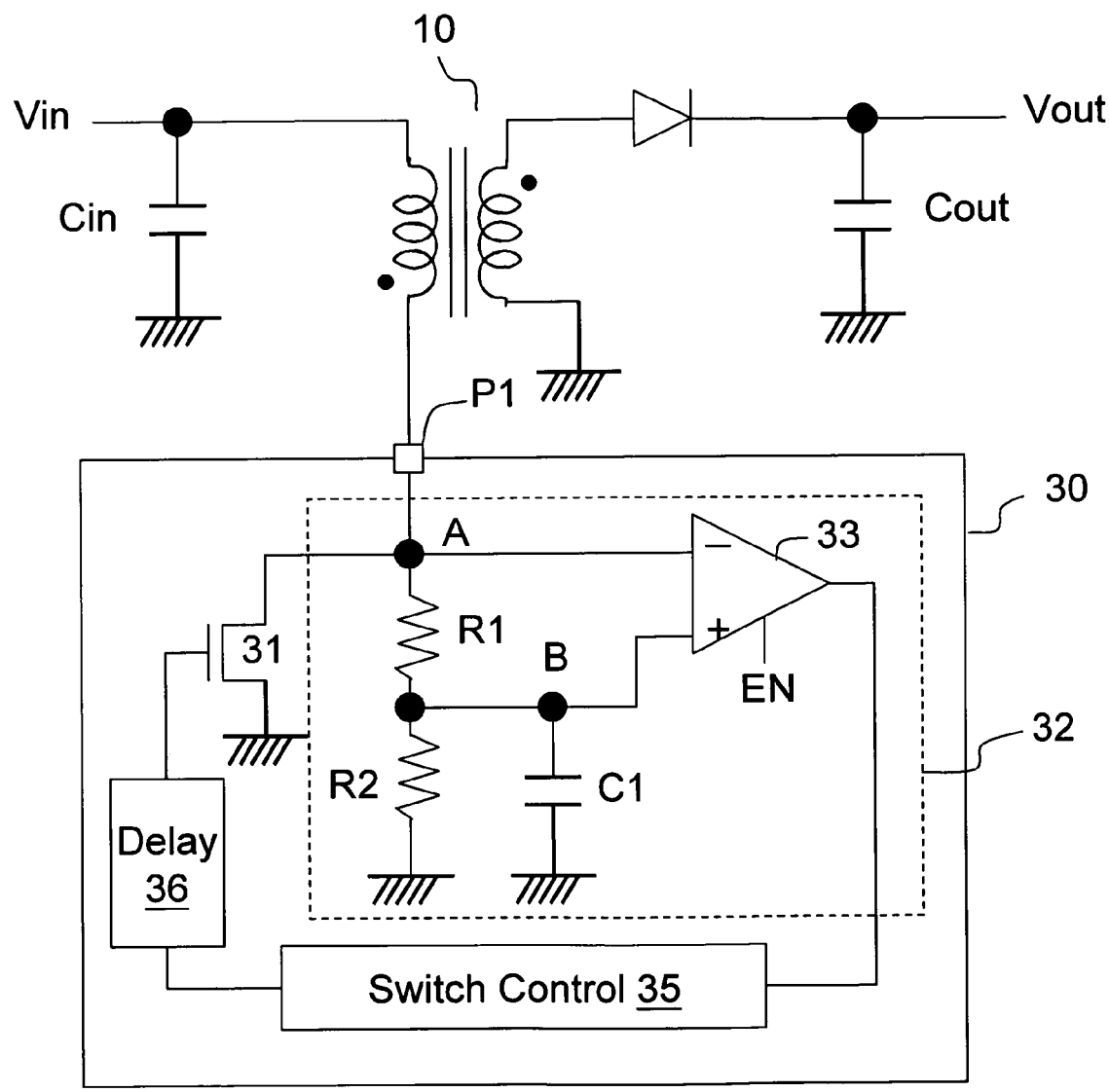
FIG. 6 is a circuit diagram showing another embodiment of the present invention.

Referring to FIG. 6, in general, the voltage at the node A drops very quickly, so the timing that the cross point X occurs is usually very close to the timing when the secondary current Isec is close to or equal to zero. However, if it is intended to turn ON the power switch 31 only after the secondary current Isec becomes zero, a delay circuit 36 may be provided in the charger control circuit 30 so that the power switch 31 is turned ON a short time after the cross point X, to ensure that the secondary winding has completely discharged. The delay circuit 36 is not limited to the location as shown in the figure, but may be positioned in front of the switch control circuit 35, or at some other locations.

Figure 7:
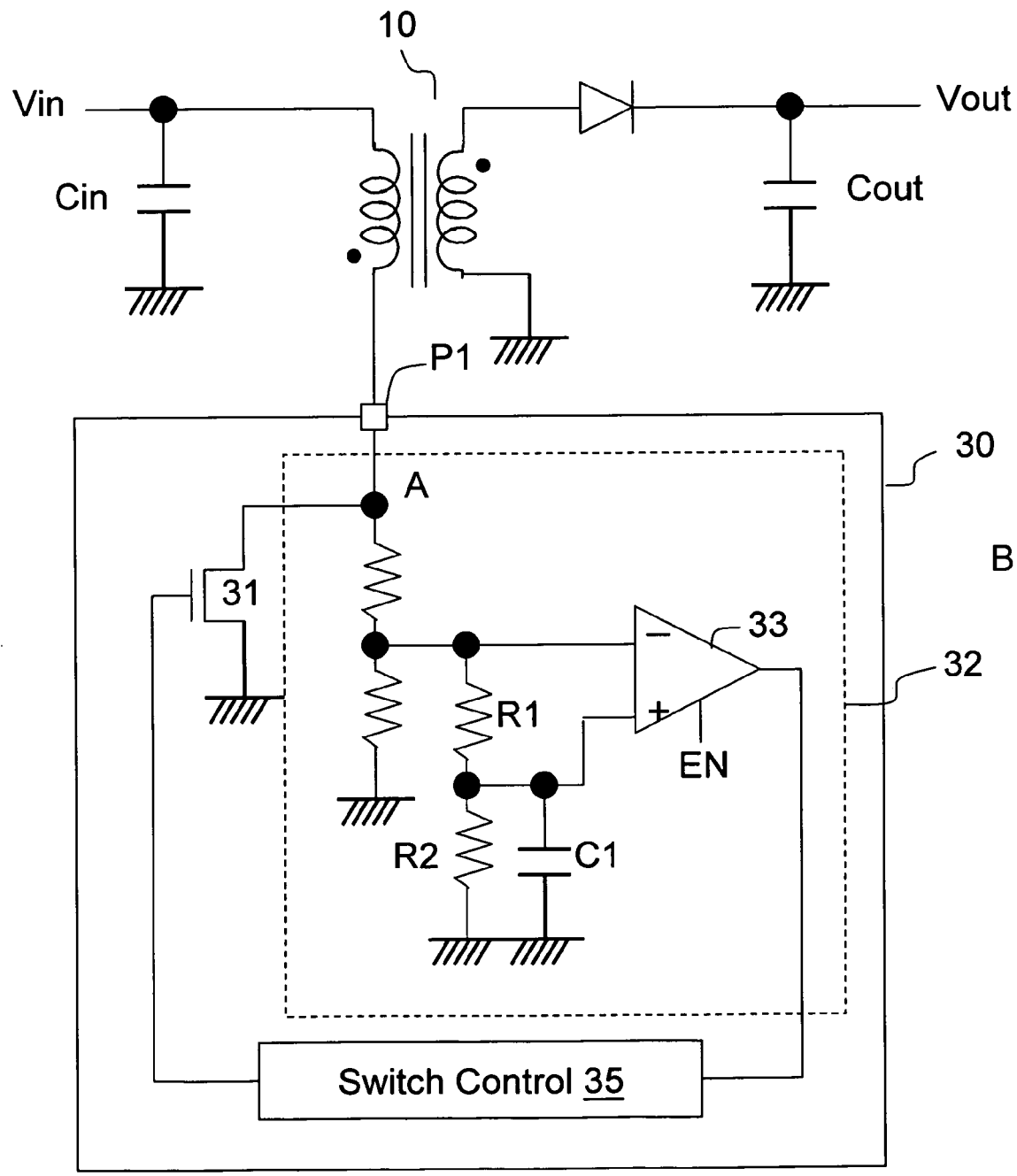
FIG. 7 is a circuit diagram showing a further embodiment of the present invention.

If there is a concern that the voltage at the node A is too high or the current amount flowing through it is too high, one input of the comparator 33 can receive a dividend voltage of the voltage at the node A, generated by voltage divider, as shown in FIG. 7.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the present invention is not limited to the application of photoflash capacitor charger; it can be applied to any kind of chargers. As another example, what is shown in the figures to be one unit block can be combined with another circuit unit, or divided into separate circuits or devices (for example, the switch control circuit 35 and the delay circuit 36 can be integrated as one unit). In view of the foregoing, the spirit of the present invention should cover all such and other modifications and variations, which should be interpreted to fall within the scope of the following claims and their equivalents.

What is claimed is:

1. A charger control circuit for controlling a charger having a transformer, the transformer including a primary winding and a secondary winding, the charger control circuit comprising:
    a power switch coupled to the primary winding;
    a switch control circuit controlling the operation of the power switch; and
    a detection circuit which generates a signal according to a voltage at a node between the power switch and the primary winding, and supplies the signal to the switch control circuit, wherein the detection circuit includes:
    a RC shunt circuit; and
    a comparator having one input receiving a voltage signal relating to the RC shunt circuit and the other input receiving a voltage signal relating to the voltage at the node.

2. The charger control circuit of claim 1, wherein the signal generated by the detection circuit determines the ON time of the power switch.

3. The charger control circuit of claim 2, further comprising a delay circuit to delay the ON time of the power switch.

4. The charger control circuit of claim 1, wherein the detection circuit further includes: a voltage divider coupled to the node, and wherein the other input of the comparator receives a dividend voltage generated by the voltage divider.

5. The charger control circuit of claim 1, wherein the comparator receives an enable signal.

6. The charger control circuit of claim 5, wherein the enable signal enables the comparator when the power switch is OFF.

7. A charger control method for controlling a charger having a transformer, the transformer including a primary winding and a secondary winding, the charger control method comprising:
    providing a power switch coupled to the primary winding;
    obtaining a first signal relating to a voltage at a node between the power switch and the primary winding;
    lowering the magnitude of the first signal and delaying the first signal to obtain a second signal;
    detecting the cross point between the first signal and the second signal; and
    controlling the operation of the power switch according to the detected cross point.

8. The charger control method of claim 7, wherein the step of controlling the operation of the power switch includes: controlling the ON time of the power switch.

9. The charger control method of claim 8, wherein the step of controlling the operation of the power switch further includes: delaying the ON time of the power switch.

10. The charger control method of claim 7, wherein the first signal is a dividend voltage of the voltage at the node.

11. The charger control method of claim 7, wherein the detection of the cross point is performed only when the power switch is OFF.

\* \* \* \* \*